March 10, 1925.
W. G. COUGHLIN
1,529,345
RAIL SECURING AND ADJUSTING DEVICE
Filed May 28, 1924    5 Sheets-Sheet 1
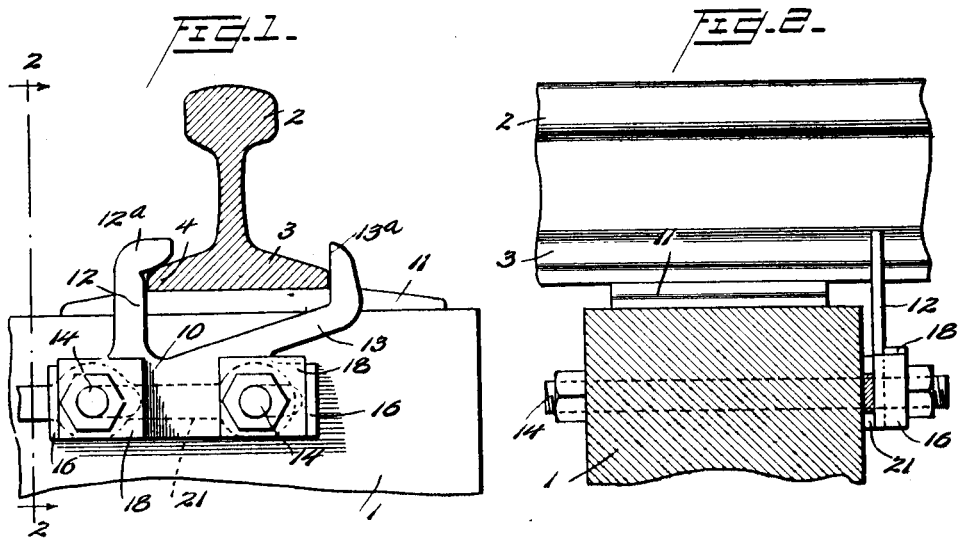
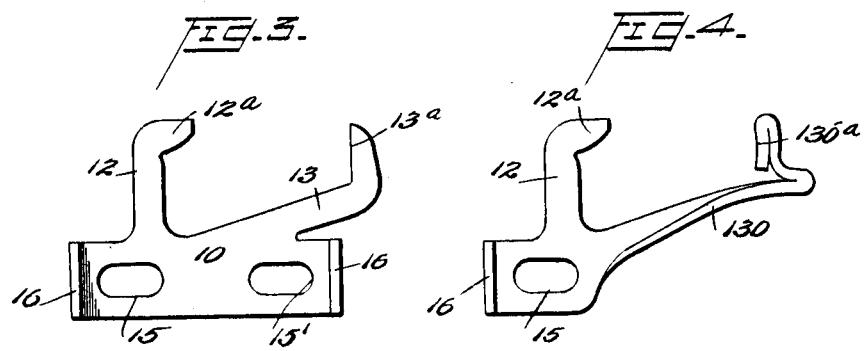
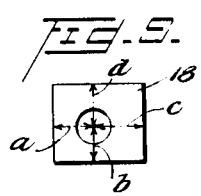
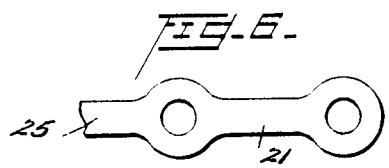
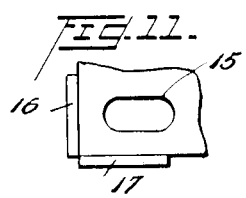
Inventor
W. G. Coughlin
By Watson, Cole, Morse & Grindle
Attorney March 10, 1925.  W. G. COUGHLIN  1,529,345
RAIL SECURING AND ADJUSTING DEVICE
Filed May 28, 1924  5 Sheets-Sheet 2
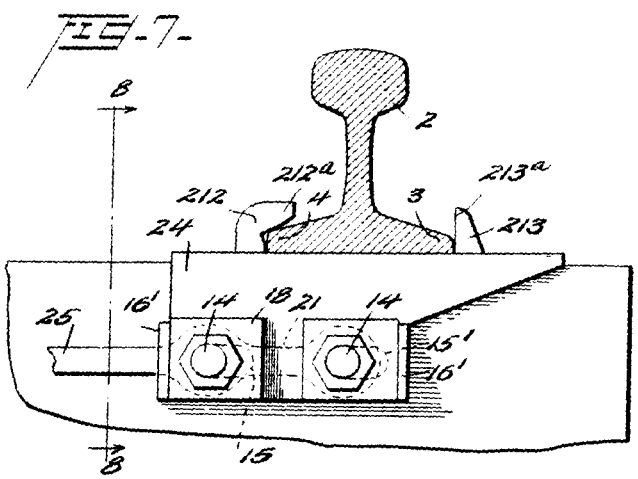
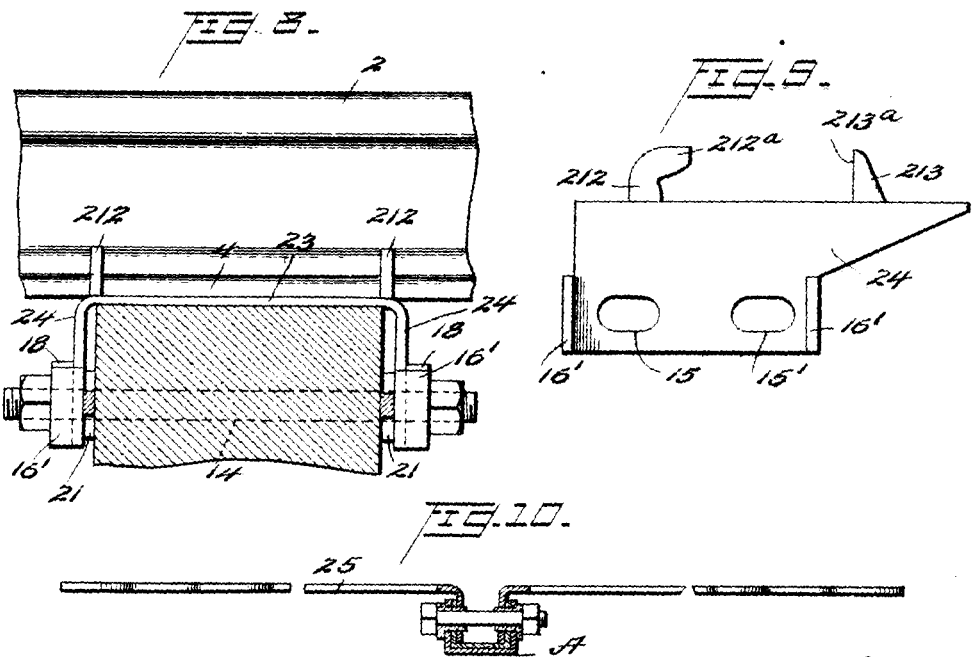
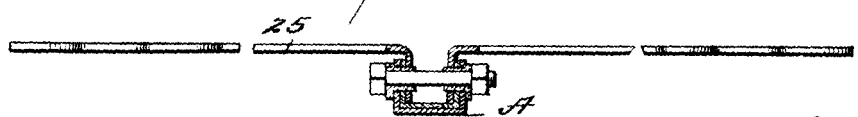

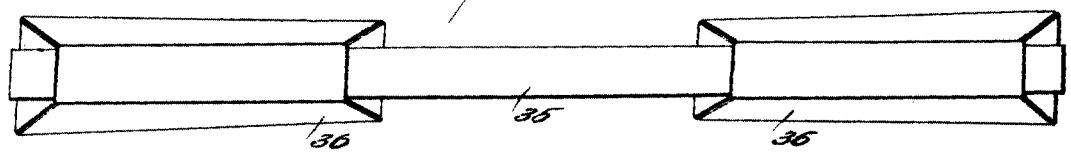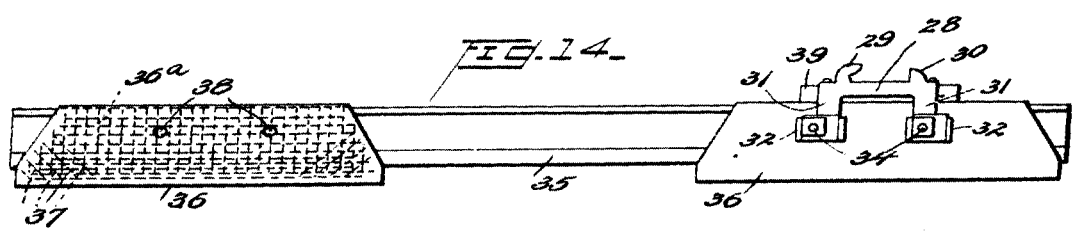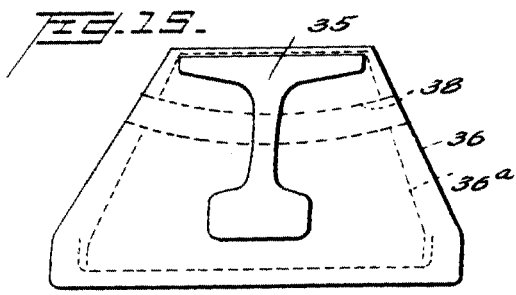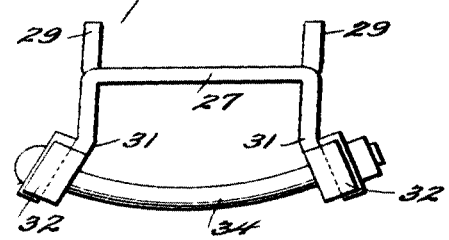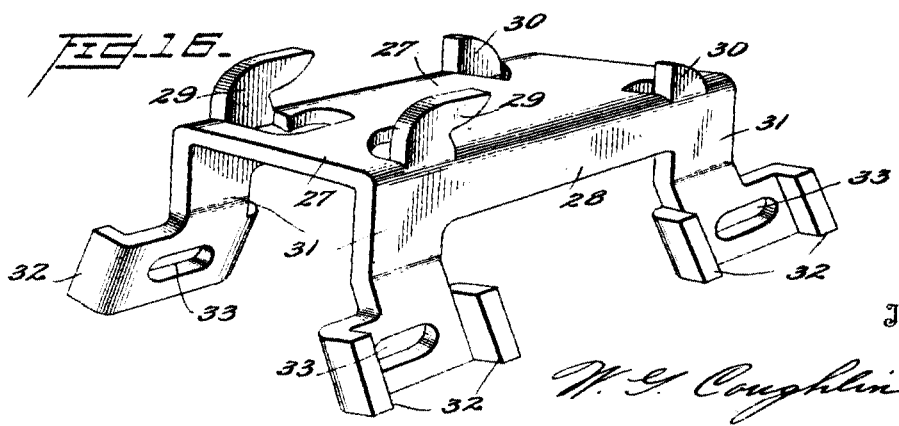

March 10, 1925.　　　　W. G. COUGHLIN　　　　1,529,345

RAIL SECURING AND ADJUSTING DEVICE

Filed May 28, 1924　　　5 Sheets-Sheet 4

Inventor
W. G. Coughlin
By Watson, Coit, Morse & Grindle
Attorney

March 10, 1925.  W. G. COUGHLIN  1,529,345
RAIL SECURING AND ADJUSTING DEVICE
Filed May 28, 1924  5 Sheets-Sheet 5
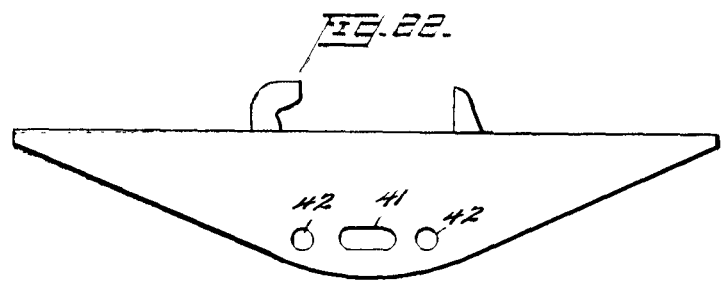
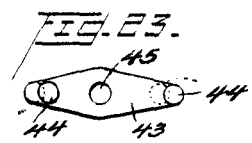
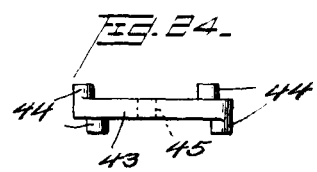
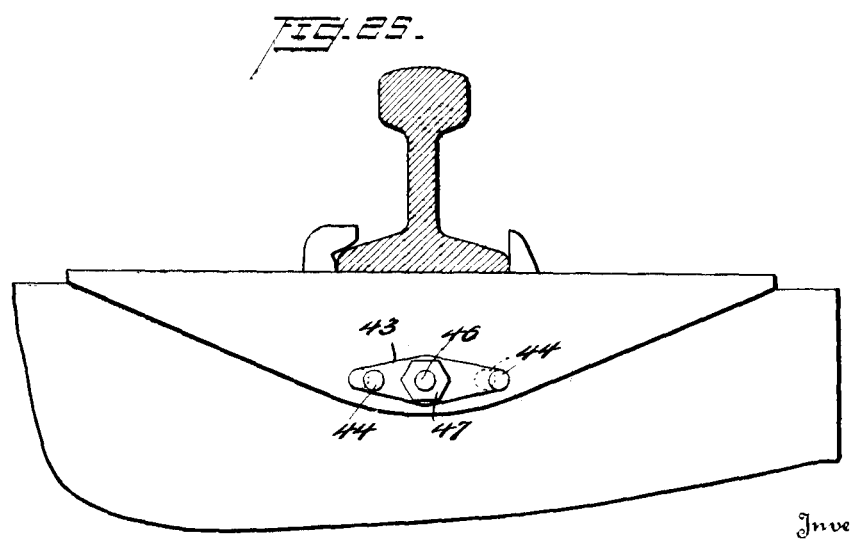

Patented Mar. 10, 1925.

1,529,345

UNITED STATES PATENT OFFICE.

WILLIAM G. COUGHLIN, OF PHILADELPHIA, PENNSYLVANIA.

RAIL SECURING AND ADJUSTING DEVICE.

Application filed May 28, 1924. Serial No. 716,479.

*To all whom it may concern:*

Be it known that I, WILLIAM G. COUGHLIN, a citizen of the United States, and a resident of Philadelphia, in the county of Philadelphia and State of Pennsylvania, have invented certain new and useful Improvements in Rail Securing and Adjusting Devices, of which the following is a specification.

The present application which is a continuation in part of my application Serial No. 633,270 relates to railways and particularly to devices for securing a rail to a cross tie.

One of the principal objects of the invention is to provide a unitary and integral rail holding device which may be used as the sole means for holding the tie to the rail and which is so formed that it will hold the rail against lateral and substantial vertical movements and against outward turning or tilting and yet will permit the rail to be inserted and withdrawn without disturbing the fixed position of the device on the tie. The main advantages of a device having this capability reside in the elimination of spikes or other auxiliary fastening devices and in the facility with which it permits a rail to be removed and replaced.

Another object is to provide a simple means for gauging the rails.

At the present time rails are secured to the ties, in most instances, by means of spikes or tie plates attached to the ties by means of spikes. After a relatively short time the ties become unfit for use because the spikes have so injured them. Of course the life of the tie is decreased because of the fact that in regauging the rails or repairing a defective fastening, the spikes are withdrawn from the tie and redriven therein, breaking or cutting more fibers. According to the present invention, a holding device is provided which may be fastened to the tie in such a way that none of the fibers subjected to stress are injured and which may be adjusted along the tie for regauging in a simple manner without in any way injuring the tie.

Other objects and features of novelty will be apparent from the description taken in connection with the drawings in which:

Figure 1 is a sectional elevation of a portion of a railway track, showing in side elevation an end portion of a tie and also showing in elevation a rail securing device constructed in accordance with the present invention.

Figure 2 is a sectional view taken substantially on the line 2—2 of Figure 1.

Figure 3 is a side elevation of the holding device or clutch detached.

Figure 4 is a view similar to Figure 3, showing another form of clutch.

Figure 5 is a view of the washer employed for effecting adjustment of the gauge of the tracks.

Figure 6 is an elevation of a connecting rod that may be employed in the invention.

Figure 7 is a view similar to Figure 1 showing a modified form of the invention.

Figure 8 is a sectional view taken substantially on the line 8—8 of Figure 7.

Figure 9 is a side elevation of the clutch or rail chair shown in Figures 7 and 8.

Figure 10 is a plan view showing a tie rod which may be used for connecting the opposite securing devices of a tie.

Figure 11 is a fragmentary elevation showing a modification.

Figure 12 illustrates a washer adapted to be used with the modification of Figure 11.

Figures 13, 14 and 15 are top, side and end views, respectively, of a built-up cross tie adapted to be used in combination with still another modification of the invention.

Figures 16 and 17 are a perspective and end view, respectively, of the modified form of the invention adapted for use with a built-up cross tie.

Figures 22, 23, 24 and 25 illustrate an alternative means for adjusting the rail holding device longitudinally of a tie.

Figure 18:
Figures 18, 19, 20 and 21 are diagrammatic views illustrating certain conditions to be satisfied in carrying the invention into practice.

Referring to the form of the invention illustrated in Figures 1 to 3 inclusive, it will be seen that the device comprises a rail clutch 10 which is constructed to engage the base flanges of the rail and to be secured to the tie by means disposed substantially at or in the neutral plane of the tie. As shown, preferably the rail 2 having the base flanges 3 and 4 rests on a plate 11 interposed between the rail and the tie. The construction of the plate 11 is immaterial so far as the present invention is concerned but preferably it does not require any spikes or other means that would injure the tie, for securing it thereto.

The clutch 10, as shown, has two arms 12 and 13. One of these arms 13 is formed, adjacent its free end, with a substantially vertical surface 13ª adapted to engage the outer base flange 3 of the rail. The opposite finger 12 has its rail engaging surfaces formed to permit the rail to be removed in certain inwardly canted positions without disturbing the fixed position of the clutch on the tie.

Figure 19:
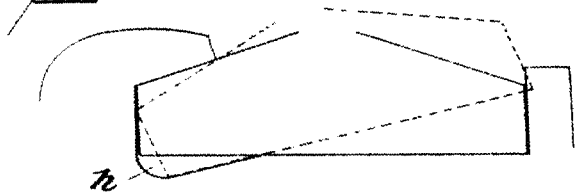
Figure 20:
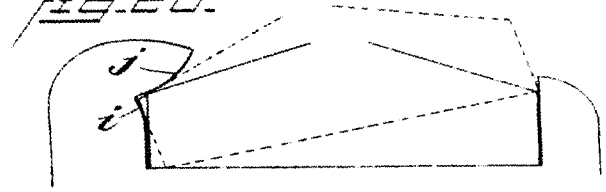
Figure 21:
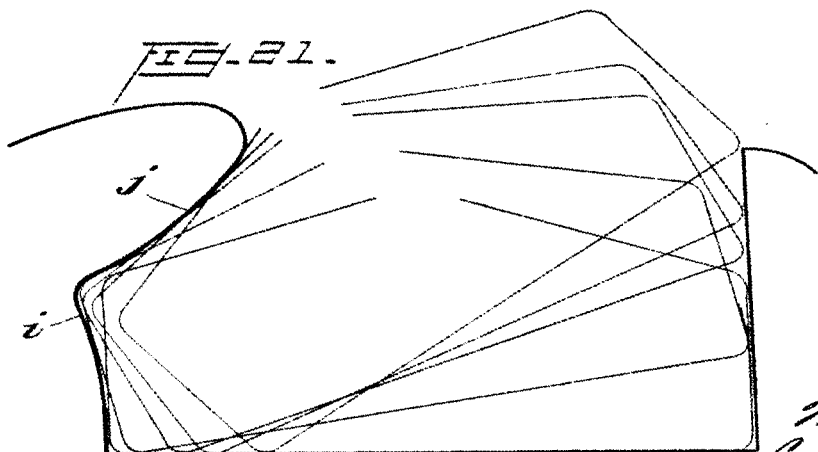

It will be obvious from a consideration of Figure 18 that a rail having a certain thickness of base seated on a plane support, such as a cross tie or tie plate, and engaged at opposite sides by vertical lugs, cannot be revolved or tilted. If, to prevent outward canting of the rail, the inner lug is formed with a part overhanging the base and engaging it, as shown in Figure 19, the rail cannot be tilted even though the entire inner surface of the support be cut away, as at $h$. It will be clear from a consideration of Figures 20 and 21 that to permit a rail of standard form to be tilted, when held between lugs as shown, and the horizontal rail support (which may be a tie or a tie plate separate from the clutch or a plate integral with the clutch) it is essential, if a minimum distance between the inner and outer lugs is to be attained, that the face of the inner lug be defined by two intersecting curves which are the envelopes of all the positions assumed by the inner side of the rail base and the sloping top thereof as the lower edge of the outer side of the rail base is raised up along the vertical face of the outer lug. Figure 21 shows a number of different positions assumed by the rail as it is canted inwardly to be withdrawn over the top of the outer lug, and shows the face of the inner lug defined by a lower curve $i$ which at its lowest part contacts the rail base, thereby preventing lateral movement of the rail, and which is curved upwardly and away from the rail base on a curve enveloping all positions assumed by the side of the base; and an upper curve $j$ which overhangs the rail base and is the envelope of all the positions assumed by the sloping top of the base. Obviously the forms of the envelope curves $i$ and $j$ are determined by the thickness of the rail base and the slope of its sides. Figures 20 and 21 show a rail base having vertical sides and substantially square corners. The envelope of a base of this form is of course different from that of a base having more rounded or sloping sides, and indeed it is easily seen that the sides of the base may be so curved that the lower curvature $i$ may approach the limiting form of a straight line. However, with a standard rail it is necessary to curve the lower face of the inner lug convexly towards the rail base, substantially as shown in Figures 20 and 21, in order to satisfy the condition of minimum distance between the opposing faces of the lugs.

The clutch 10 is preferably secured to the tie by means which is disposed substantially at the neutral axis of the tie. As shown, for this purpose, the clutch is formed with apertures 15, 15' and bolts 14 are disposed in these apertures and extend horizontally through the tie, the bolts being rigidly connected by a rod 21.

It will be seen that the means thus far described holds the rail to the tie against movement longitudinally and laterally of the tie also against tilting or canting of the rail outwardly. Furthermore the strength of the tie has not been materially decreased by this securing means as no spikes are employed and the fibers of the tie at the top and bottom thereof, which are subjected to the maximum strains, are not in any way injured by this securing means.

If it is found that the bolts 14 do not provide sufficient bearing surface in the tie, then their bearing surfaces may be increased by making the bolts hollow and of larger diameter.

If it is desired to make the holding device so that the gauge of the rails may be adjusted, then in the form of the invention illustrated, the clutch 10 adjacent the bolt holes 15 15' is provided with flanges 16 projecting from the flat surface of the clutch and the holes 15 15' are made elongated as shown in Figure 3. Washers 18, such as shown in Figure 5, are placed on the bolts 14, as shown in Figure 1, and have one of their marginal edges bearing against the flanges 16. The washer 18 is made so that the hole therein is eccentrically located with respect to the marginal edges. Thus the distances $a$, $b$, $c$ and $d$ (Fig. 5) are all different. So by turning the washers to bring different ones of their marginal edges in contact with the flanges 16 of the clutch, the rail may be adjusted laterally to change the gauge of the track or a single washer with two holes may be employed.

If desired, the clutch at one end of the tie may be connected with the clutch at the other my means of connecting rod 25, and in some cases this may be made integral with the rod 21 previously mentioned. If necessary, where the tie rod is employed, the clutch at one end of the tie may be insulated from the clutch at the other by any suitable construction such as shown at A, Fig. 10.

It will be observed that the rail 2 is held against tilting or canting outwardly but may be canted inwardly for purposes of ready removal. It will be understood of course that the rail, in use, has no tendency to cant inwardly, and the clutch construction is such that it securely holds the rail against any tendency to overturn outwardly, or to move laterally in the direction to effect spreading of the rails.

In addition to the construction described above, the invention may be incorporated in various other forms. Thus as shown in Figure 4, the finger 130 of the clutch may be twisted through an angle of about 90° presenting a flat bearing surface 130ª to the rail flange. This arrangement provides a much greater bearing area in contact with the rail flange. If desired the end portion of the finger may be bent back on itself or doubled over, thus providing for reforming of the finger in case of wear. In this modification, the clutch is formed with only one hole 15 and flange 16 for coaction with a single bolt and a single eccentric washer, but suitable reinforcement can be provided if desired.

Another form of the invention is illustrated in Figures 7 to 9 inclusive. In this form the rail chair or plate between the rail and the tie is incorporated with the securing or holding means. Thus as shown the flat plate 23 between the tie and the rail, at one or both sides is provided with a depending flange 24 disposed parallel with the adjacent side surface of the tie. The plate 23 is provided with fingers 213 and 212 struck up therefrom. Preferably there are two of each kind of fingers. The outer fingers 213 are provided with vertical surfaces 213ª engaging the base flange 3 of the rail whereas the opposite fingers 212 are formed with overhanging portions or lugs 212ª, engaging the top surface of the base flange 4 thus preventing the rail from canting or turning outwardly, these lugs having their inner faces curved as previously described. It will be seen that the arrangement is such that the rail may be canted inwardly and then withdrawn from the securing means. The side plates 24 are secured to the tie in substantially the same manner as described in connection with the form shown in Figure 1. Thus as shown, the plates 24 are formed with apertures 15, 15' for the transverse bolts 14 disposed substantially at the neutral plane of the tie.

This form of the invention may also be constructed so that the rails may be adjusted laterally, and for this purpose the flanges 24 adjacent the holes 15, 15' may be provided with the projecting flanges 16' and the holes 15, 15' may be elongated as shown in Figures 7 and 9. A washer such as shown in Figure 5 is associated with each end of the bolts 14 and arranged to bear against the flanges 16'. The adjustment of the rail for gauging the track is effected in the same manner as described in connection with the form illustrated in Figure 1.

A further modification of the invention is illustrated in Figures 11 and 12. Thus in addition to the flange 16 adjacent the hole 15, a second flange 17 may be provided, and disposed at right angles to the flange 16. When this arrangement of flanges is employed a washer such as shown in Figure 12 is used. The distances of the center of the hole from two of the edges of the washer are alike, but the distances from the center of the hole to the other two edges are different. Thus as shown in Figure 12, the distances $f$ and $g$ are different from the distances $e$. If the washer 18', shown in Figure 12, is placed on the bolt with edge $x$ in contact with flange 16 and edge $y$ in contact with flange 17, the rail will have a certain position relative to the tie. Now if a washer is reversed about its vertical axis as shown in Figure 12, the edge $z$ will be brought in contact with flange 16, the edge $y$ remaining in contact with flange 17. The distance $e$ being different from the distance $g$, the rail will thus be adjusted a slight amount laterally. A third adjustment may be obtained by placing the washer so that its edge $r$ will be brought in contact with flange 16, edge $x$ being in contact with flange 17. It will be noted that only three adjustments can be obtained with this arrangement where four adjustments are possible when only one flange such as 16 is employed. However under certain conditions flange 17 may be desirable, for example, where conditions are such that the washers tend to turn on their axes due to vibration or other causes.

In the form of the invention illustrated by Figures 13 to 16, the rail holding device consists of a plate 27 formed with dependent side flanges 28 adapted to engage the top and sides of a built-up tie such as shown in Figures 13, 14 and 15, or an ordinary wooden tie. The plate 27 adjacent its four corners has the rail engaging lugs 29 and 30, which are formed, in accordance with the principles heretofore explained, to hold the rail securely on the tie and yet permit it to be taken off and put on by simply canting it and withdrawing or inserting over the top of the outer lugs 30, without in any manner disturbing the rail holding or clutch device. This form of the invention further comprises dependent lugs or ears 31 extending from the four corners of the flanges 28 and formed at the lower ends thereof with outstanding abutments or flanges 32 and longitudinally elongated apertures 33 between said flanges. The device is adapted to be secured to a tie by two bolts 34 which pass through the tie and through the elongated apertures and through eccentric holes in square washers of the form illustrated by Figure 5 located between the flanges, a nut being provided at one or both ends of the bolts to clamp the parts in adjusted positions. From the foregoing description, it will be understood without further explanation that the rail holding or clutch device of this form may be adjusted along the tie for gauging by simply withdrawing the washers from the flanges 32 and replacing them in different positions.

Figures 13, 14 and 15 illustrate a tie particularly adapted for use with a rail fastening tie plate such as shown by Figures 16 and 17. The central, or tie member proper, is composed of metal or similar durable material, preferably a section of railroad rail 35. The ends of rail 35 are anchored in bearing blocks 36 which are formed to provide an ample bearing on the road bed. These bearing blocks may be composed of concrete, wood or other durable material. Figures 13, 14 and 15 illustrate a preferred form, in which the bearing blocks are composed of reinforced concrete and have a pyramidal form in order to provide a wide base and to concentrate the load near the middle third of the block. The blocks are also tapered inwardly having a maximum width at their outer ends, as indicated in the plan view, Figure 13. A tie plate of the form shown in Figures 16 and 17 fitting over a bearing block of this form will be held by the tapered construction of the block against outward thrust in addition to the holding action of the bolts. As clearly indicated in Figures 14 and 15, the blocks are reinforced by a metallic mesh 36ª which extends in an unbroken piece across the top of the block and down along the sides thereof at a slightly greater slope than the sides of the block to a point near the base where its ends are turned down vertically. An additional mesh is laid parallel with and slightly above the base of the block with its sides turned vertically upward to overlap the vertical ends of the upper mesh, and with the ends of its longitudinal members turned upward, as indicated at 37. This form of reinforcement thus provides a complete lock and cage greatly strengthening the block and preventing disintegration of the cementing substances forming it. The metallic mesh being composed of two pieces, while furnishing an absolute lock and cage because of its overlapping edges, materially facilitates manufacture, as it in nowise interferes with the placing of the cementing substance. Each block is provided with two or more holes 38 extending through the tie rail for the reception of bolts. These holes may be either straight or curved, but are preferably curved as shown, and may be lined with an insulating material to prevent short circuiting of the track circuit. A wooden block 39 may be placed between the top of the bearing blocks and the rail fastening tie plate to absorb shocks, being fastened to the tie plate.

It will be observed that there is considerable space between the bearing blocks 36 and that the rail used as the tie proper offers a relatively small bearing area between the blocks on the road bed. One of the principal advantages in the use of a tie of this form resides in the elimination of that track condition known as "center-bound". Center-bound track, which exists to a greater or less extent on all railroads using ordinary cross ties, is caused by the slight deflection of the ties directly under the rail through the passing loads, these deflections causing a cradle or hollow under the ends of the ties. The ballast thus displaced is crowded out at the ends, at the sides and towards the middle of the track. The crowding of the ballast towards the center of the track from both sides causes the center portion of the road bed to become solidified and eventually to become the part of the road bed forming the tie support. Due to the fact that the loads on the two rails are not ordinarily evenly balanced, this condition results in the train lurching from side to side and causes rough riding which is eliminated with the tie of Figures 14 and 15. Furthermore, a built-up tie of the constructions described presents a wide base and large bearing area and consequently fewer ties per rail are required as compared with prior constructions. In fact, the reduction in the number of ties in this construction is limited practically only by the strength of the track rail as a beam between supports.

Figures 22 to 25 illustrate a modification of the adjusting means for gauging. The device shown may be applied to any form of holding device. It is shown applied to a combined clutch and chair of the general form illustrated in Figures 7 to 9. For adapting the chair to this device, the depending sides thereof are provided with central longitudinally elongated holes 41 transversely aligned, and with a hole 42 spaced from each end thereof, the said holes 42, in the form illustrated, being circular. The adjusting device consists of a washer 43 formed on each side with a pair of cylindrical lugs 44. The distance between the lugs 44 on one side of the washer is exactly equal to the distance between the lugs on the other side, which distance is also equal to the distance between the holes 42, so that either pair of lugs may be engaged in said holes. It will be observed from Figure 24 that the lugs on one side of the washer are longitudinally offset from the lugs on the other side. The washer is also provided with a central aperture 45 and all of the lugs 44 are spaced different distances from this aperture. Figure 25 shows the device applied to the chair. It is secured by having a pair of its lugs engaging in the apertures 42 and by a bolt 46 which passes through the tie and through the elongated holes 41 and the circular holes 45 of the washers, it being understood that there is a washer on each side. The chair may be secured in another position with respect to the tie by simply unscrewing the nut 47, rotating the washers through an angle of 180° about the axis of bolt 46 moving the chair longitudinally of the tie until the holes 42 align with the lugs 44 in this portion, and finally engaging the lugs in the holes and screwing up the nuts. The chair may be secured in another position with respect to the tie by removing the washers, turning them through an angle of 180° about a longitudinal axis (upside down), and then bringing the chair into a position where the holes 42 align with the lugs. Still another position of the chair may be obtained by rotating the washer from the last position through an angle of 180° about the axis of bolt 46. It will thus be seen that this simple device will secure the chair to the tie in four different positions. In order to obtain still another position of the chair, it may be secured initially to the tie without the washer by means of bolts passing through the tie and through the holes 42, this position being a different one from any of the positions obtained with the washers.

It is to be understood, although several forms of the invention have been described in detail, it is not thus limited but includes modifications and changes which come within the scope of the appended claims.

Having thus described the invention what is claimed as new and desired to be secured by Letters Patent is:

1. A device for holding a rail on a cross tie including a member adapted to rest on the top of a tie, and means for securing the rail to said member, comprising two non-bendable projections adapted to engage opposite sides of the base of the rail, the distance between the opposing faces of said projections at the bottoms thereof being substantially equal to the width of the base of the rail, said opposing faces being formed to permit the rail to be inserted and withdrawn without disturbing the device, by canting the rail, one of said projections consisting of a vertical part contacting with an edge of the base of the rail and a part overhanging the top of said base and always substantially in contact therewith.

2. A device for holding a rail on a cross tie including a member adapted to rest on the top of the tie and having a flat upper surface and means for securing the rail to said member comprising two projections adapted to engage opposite edges of the base of the rail, the inner face of the outer of said projections being substantially vertical and the opposing face of the inner of said projections being defined by curves which are the envelopes of all the positions assumed by the side and sloping top of the base as the rail is canted inwardly.

3. In combination with a cross tie, means for holding a rail to the tie including a member adapted to rest on the top of the tie and means for securing the rail to said member comprising two projections engaging opposite sides of the base of the rail, the inner face of the outer of said projections being substantially vertical and the opposing face of the inner of said projections comprising lower and upper intersecting surfaces convexly curved, the upper surface overhanging the rail base, and the curvatures being such that the rail can be inserted and withdrawn only by canting the same inwardly.

4. In combination with a cross tie, means for securing a rail to the tie including a member resting on the top of the tie and means for securing the rail to said member comprising two projections engaging opposite sides of the base flanges of the rail, so that there is substantially no lateral play of the rail when seated between said projections, the face of the inner of said projections having a lower convex surface and an intersecting upper convex surface which extends over one of said flanges, the curvatures of these surfaces being such that the rail may be inwardly canted and withdrawn over the top of said outer projection without disturbing said member.

5. A device for holding a rail on a cross tie including a member adapted to rest on the top of the tie and means for securing the rail to said member comprising two upwardly extending portions adapted to receive between them the base flanges of a rail and contact said flanges at the lower part thereof, the surfaces of one of said portions being defined by curves which are the envelopes of all the positions assumed by the side and top of the base as the rail is canted towards said portion above the horizontal plane surface of the rail support.

6. A device for holding a rail on a cross tie including a member adapted to rest on the top of the tie and means for securing the rail to said member without spikes or the like passing through the member, said means comprising a lug having a vertical face engaging the outer edge of the base of the rail, and a non-bendable second lug engaging the inner edge and top of the base of the rail, said latter lug being shaped to permit the rail to be inserted and withdrawn by canting the rail toward the center of the track.

7. A device for holding a rail on a cross tie consisting of a member adapted to rest on the top of a tie and means for securing the rail to said member, comprising two upwardly extending non-bendable lugs adapted to engage opposite sides of the base flange of the rail, the face of one of said lugs comprising a lower surface contacting an edge of the base of the rail and an intersecting upper surface overhanging and substantially contacting the top of the base of the rail, said surfaces being convexly curved.

8. A combined tie plate and rail clutch comprising a horizontal plate formed with depending side flanges adapted to fit over a cross tie, and a vertical lug adjacent each of the four corners of said plate, adapted to receive between them the base of a rail, the distance between the opposing faces of said lugs at the bases thereof being substantially equal to the width of said base, the rail engaging surfaces of said lugs being formed to permit a rail to be inserted and withdrawn only by canting the same.

9. A device for holding a rail on a tie, including a horizontal plate having integral depending side flanges adapted to fit over a cross tie, and means for securing the rail to said plate, comprising upwardly projecting lugs adjacent the four corners thereof, the inner faces of the outer pair of said lugs being substantially vertical and the opposing faces of the inner pair being defined by curves which are the envelopes of all positions assumed by the side and top of a flange of the base of the rail, as the rail is canted inwardly to the position where it may be withdrawn over the top of the outer lugs, the distance between the inner and outer lugs adjacent the bases thereof being substantially equal to the width of the rail base.

10. A combined tie plate and rail clutch comprising a horizontal plate formed with depending side flanges adapted to fit over a cross tie and with a pair of lugs adapted to receive between them the base flanges of a rail, the rail engaging surfaces of said lugs being formed to permit a rail to be inserted or withdrawn only in certain inwardly canted positions thereof, and integral depending ears extending from the four corners of said flanges provided with holes adapted to receive bolts passing through the tie.

11. A combined tie plate and rail clutch comprising a horizontal plate formed with depending side flanges adapted to fit over a cross tie, lugs projecting upwardly from said plate adapted to receive between them the base flanges of a rail, the rail engaging surfaces of said lugs being formed to permit a rail to be inserted or withdrawn only by canting the same, ears depending from said flanges provided with longitudinally elongated holes adapted to receive bolts passing through the tie, and outstanding flanges on said ears at both sides of said holes, for the purpose described.

12. An integral tie plate and rail clutch comprising a horizontal plate having depending side flanges adapted to fit over a cross tie and having a pair of rail engaging lugs projecting upwardly therefrom, the rail engaging surfaces of said lugs being formed to permit a rail to be inserted or withdrawn only by canting the same, and ears extending downwardly from said flanges provided with holes adapted to receive bolts passing through the tie.

13. The combination with a tie consisting of a tie member and bearing blocks attached to the ends thereof, said bearing blocks having a longitudinally tapered form with maximum width at the outer ends thereof, of a combined tie plate and rail clutch for each block comprising a horizontal plate overlying the block having depending side flanges formed to fit the sides of the block and having lugs projecting upwardly therefrom adapted to receive the base flange of a rail, the rail engaging surfaces of said lugs being formed to permit a rail to be inserted and withdrawn only by canting the same, and means for fastening said tie plate flanges to said blocks.

14. The combination with a tie consisting of a tie member and bearing blocks attached to the ends thereof, said blocks being longitudinally tapered with maximum width at the outer ends thereof, of a combined tie plate and rail clutch for each block comprising a horizontal plate overlying the block having depending side flanges formed to fit the sides of the block and having lugs projecting upwardly therefrom adapted to receive the base flanges of a rail, the rail engaging surfaces of said lugs being formed to permit a rail to be inserted and withdrawn only by canting the same, said tie plate flanges having downwardly extending ears engaging the sides of the blocks provided with apertures, and bolts passing through the blocks and apertures.

15. A device for holding a rail on a cross tie including a clutch having a flat body portion adapted to be secured to a side of the tie and having two fingers, one of which extends substantially vertically from said body portion and has a portion adapted to overlie a base flange of the rail and the other of which extends in an upwardly inclined direction and has a substantially vertical end portion adapted to engage the other base flange of the rail, the first mentioned finger being formed to permit the rail to be canted and withdrawn over the top of the other finger without disturbing the clutch.

16. A device for holding a rail on a cross tie, including a clutch having a body portion adapted to be secured to a side of the tie and having two upwardly extending fingers adapted to engage the inner and outer edges of the base flanges of the rail, the inner of said fingers having a portion adapted to overlie one of said flanges formed to permit removal of the rail by inward canting, and means for adjusting said clutch longitudinally of the tie.

17. A device for holding a rail on a cross tie, including a clutch having a body portion adapted to engage the side of the tie and having two upwardly extending fingers adapted to clutch between them the base flanges of the rail, the inner of said fingers having a portion adapted to overlie one of said flanges and formed to permit removal of the rail by inward canting, said body portion having a horizontally elongated hole and having a shoulder spaced from the inner end of said hole for the purpose described.

18. In combination with a rail and its supporting cross tie, a clutch having a flat body portion engaging a side of the tie and having two upwardly extending fingers clutching between them the base flanges of the rail, the inner of said fingers having a portion overlying one of said flanges formed to permit removal of the rail by inward canting and the outer of said fingers having a substantially vertical rail engaging portion, said body having a horizontally elongated hole and having a vertical shoulder adjacent its inner edge, a rectangular washer adapted to engage said shoulder having an eccentrically positioned aperture, and a bolt secured to the tie passing through said hole and aperture.

19. In combination with a rail and its supporting cross tie, a clutch having a flat body portion lying against a side of the tie and having two upwardly extending fingers clutching between them the base flanges of the rail, the inner of said fingers having its end portion extending over one of said flanges and presenting a convex surface thereto and the outer of said fingers having its flange engaging surface substantially vertical, and means for adjusting said clutch longitudinally of the tie.

20. In combination with a rail and its supporting cross tie, a clutch having a flat body portion lying against a side of the tie and having two upwardly extending fingers clutching between them the base flanges of the rail, the inner of said fingers having a portion overlying said flange engaging portion substantially vertical, said body having a horizontally elongated hole and having inner and outer marginal flanges extending outwardly at right angles thereto, a rectangular washer engaging said flanges having an eccentrically located aperture, and a bolt secured to the tie passing through said hole and aperture.

21. In combination with a rail and a wooden cross tie, a device securing the rail to the tie comprising a member having two fingers clutching between them the base flanges of the rail, the inner of said fingers having a portion overlying said flange and formed to permit removal of the rail only by inward canting and without disturbing said device, and a bolt securing said member to the side of the tie and passing through said tie well below the upper surface thereof.

22. In combination with a rail and a wooden tie, a device for securing the rail to the tie comprising a member having two upwardly extending fingers clutching between them the base flanges of the rail, the inner of said fingers having a portion overlying one of said flanges formed to permit removal of the rail by inward canting and the outer of said fingers having its flange engaging surface substantially vertical, and a bolt securing said member to the side of the tie passing through said tie substantially in the neutral plane thereof.

23. In combination with a rail and its supporting cross tie, a holding device for the rail comprising a member engaging the side of the tie having two fingers clutching between them the base flanges of the rail, a bolt passing through said tie and member, a second bolt passing through said tie at a point horizontally spaced from said first bolt, and a rigid member connecting said bolts.

24. In combination with a rail and its supporting cross tie, a holding device for the rail comprising a plate lying against a side of the tie having two upwardly extending fingers clutching between them the base flanges of the rail, the inner of said fingers having a portion overlying said flange formed to permit removal of the rail by inward canting and the outer of said fingers having its flange engaging portion substantially vertical, a bolt passing through said tie and plate, a second bolt passing through said tie, and a rigid strap connecting said bolts.

25. In combination with a rail and a wooden cross tie, a holding device for the rail comprising a plate lying against a side of the tie having two upwardly extending fingers clutching between them the base flanges of the rail, a bolt passing through said tie and plate, a second bolt passing through said tie, and a rigid strap connecting said bolts, said bolts lying substantially in the neutral plane of said tie.

26. In combination with a rail and a wooden cross tie, a holding device for said rail comprising a plate lying against a side of the tie having two upwardly extending fingers clutching between them the base flanges of the rail, the inner of said fingers having a portion overlying said flange and the outer of said fingers having a substantially vertical flange engaging portion, said plate having laterally spaced horizontally elongated holes and having an abutment spaced from the inner end of the inner hole and an abutment spaced from the outer end of the outer hole, washers engaging said abutments each having an eccentrically located aperture, bolts passing through said tie and through said holes and apertures, and a rigid strap connecting said bolts.

27. In combination with the rails and their supporting cross ties, holding and adjusting devices for the rails comprising plates secured to a side of a tie and each having two upwardly extending fingers clutching between them the base flanges of the rails, a tie rod connecting said plates, and means for adjusting said plates longitudinally of the tie.

28. In combination with the rails and their supporting cross ties, holding devices for said rails comprising plates engaging the sides of the ties and each having two upwardly extending fingers clutching between them the base flanges of the rail, the inner of said fingers having a portion overlying one of the rail flanges and the outer of said fingers having substantially vertical flange engaging portions, said plates each having two laterally spaced horizontally elongated holes and having abutments spaced from the ends of said holes, washers engaging said abutments having eccentrically located apertures, bolts passing through said ties and through said holes and apertures, rigid straps connecting said bolts, and tie rods connecting said inner bolts.

29. In combination with a rail and its supporting cross tie, a holding device for said rail comprising a plate lying against a side of the tie and provided with a longitudinally elongated hole, a bolt passing through the tie and said hole, and a washer on said bolt provided with means for engaging and holding said plate in a plurality of positions thereof longitudinally spaced along the tie.

30. In combination with a rail and its supporting cross tie, a holding device for said rail comprising a plate lying against the tie and provided with a longitudinally elongated hole, a member rigid with the tie passing through said hole, and a device on said member provided with means for engaging and holding said plate in a plurality of positions thereof longitudinally spaced along the tie.

In testimony whereof I hereunto affix my signature.

WILLIAM G. COUGHLIN.